(12) United States Patent
Igarashi et al.

(10) Patent No.: US 8,009,599 B2
(45) Date of Patent: Aug. 30, 2011

(54) WIRELESS COMMUNICATION DEVICE AND WIRELESS COMMUNICATION METHOD

(75) Inventors: Kei Igarashi, Yokosuka (JP); Akira Yamada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1198 days.

(21) Appl. No.: 11/687,845

(22) Filed: Mar. 19, 2007

(65) Prior Publication Data

US 2007/0223413 A1 Sep. 27, 2007

(30) Foreign Application Priority Data

Mar. 24, 2006 (JP) ................. P2006-083316

(51) Int. Cl.
*H04Q 7/20* (2006.01)
(52) U.S. Cl. .................. 370/310.2; 455/501
(58) Field of Classification Search ........... 370/310.2; 455/501, 502, 512–515, 527, 67.13
See application file for complete search history.

(56) References Cited

U.S. PATENT DOCUMENTS

| | | | | |
|---|---|---|---|---|
| 5,835,494 | A * | 11/1998 | Hughes et al. | 370/397 |
| 6,256,334 | B1 * | 7/2001 | Adachi | 375/132 |
| 7,676,236 | B2 * | 3/2010 | Nanda et al. | 455/509 |
| 2002/0136233 | A1 * | 9/2002 | Chen et al. | 370/445 |
| 2003/0013451 | A1 * | 1/2003 | Walton | 455/447 |
| 2005/0202824 | A1 | 9/2005 | Goldhammer | |

FOREIGN PATENT DOCUMENTS

| | | |
|---|---|---|
| EP | 0 674 454 A2 | 9/1995 |
| GB | 2 249 922 | 5/1992 |
| JP | 2002-171257 | 6/2002 |
| JP | 2004-260337 | 9/2004 |
| JP | 2004-343407 | 12/2004 |
| WO | WO 03/047174 A1 | 6/2003 |
| WO | WO 2004/060001 A1 | 7/2004 |

OTHER PUBLICATIONS

"Part 11: Wireless LAN Medium Access Control (MAC) and Physical Layer (PHY) Specifications: Amendment 7: Medium Access Control (MAC) Quality of Service (QoS) Enhancements", IEEE P802.11e/D12.0, Nov. 2004, 195 pages.
"Wireless LAN Medium Access Control (MAC) and Physical Layer (PHY) Specifications," ANSI/IEEE Std 802.11, 1999 Edition, 528 pages.

(Continued)

*Primary Examiner* — Dwayne Bost
*Assistant Examiner* — Joseph Dean, Jr.
(74) *Attorney, Agent, or Firm* — Oblon, Spivak, McClelland, Maier & Neustadt, L.L.P.

(57) ABSTRACT

A wireless communication device that transmits packets, on the basis of a packet transmission scheme for allocating wireless bands with virtual carrier sensing, has: monitoring module for monitoring packets communicated between other wireless communication devices and base stations for a local cell and another cell; determination module for determining whether a possibility exists that a local station receives other-cell interference resulting from communication between the wireless communication device in the other cell and the base station, on the basis of the monitoring result; occupancy period detection module for detecting an occupancy period occupied due to communication between the wireless communication device in the other cell and the base station, on the basis of the monitoring results, when determination is made that receiving the other-cell interference is possible; and timing recognition module for recognizing a timing for avoiding the other-cell interference in a predetermined period on the basis of the occupancy period.

9 Claims, 9 Drawing Sheets

OTHER PUBLICATIONS

"IEEE Standard Part 11: Wireless LAN Medium Access Control (MAC) and Physical Layer (PHY) Specifications", (ISO/IEC 8802-11, ANSI/IEEE Std 802.11-1997): Introduction, XP-002249131, Jun. 26, 1997, pp. i-xiv and p. 28, pp. 71-99.

Office Action issued Aug. 3, 2010, in Chinese Patent Application No. 200710089446.6 (with English-language Translation).

Office Action issued Jan. 11, 2011, in Japanese Patent Application No. P2006-083316 (with English translation).

* cited by examiner

WIRELESS COMMUNICATION DEVICE AND WIRELESS COMMUNICATION METHOD

BACKGROUND OF THE INVENTION

1. Field of the Invention

The present invention relates to a wireless communication device and wireless communication method for executing communication priority control in a wireless LAN communication system, particularly with a CSMA/CA (Carrier Sense Multiple Access with Collision Avoidance) method.

2. Related Background Art

In the CSMA/CA method, during a random period before a terminal performs transmission, virtual carrier sensing is performed, and verification is made as to whether another terminal is communicating with a base station, and then actual transmission of a packet is performed after waiting for the communication between the other terminal and the base station to end if the other terminal and the base station have been communicating. At this time all terminals have equal access to transmit. In virtual carrier sensing, after a channel becomes idle, only in an IFS (Inter Frame Space) period, a random number is generated within a provided CW (Contention Window) range, a random period is determined on the basis of this random number, and backoff control to be described below is performed in this random period. In backoff control, the calculated random number is set as an initial value, and control is performed to actually transmit a packet when the initial value reaches zero after reducing the initial value as time goes by. Here, IFS is prescribed by the wireless LAN standard IEEE802.11, and is a predetermined period in which idle detection is performed before transmission, and CW is the maximum value of the random number that can be obtained for the backoff, and is a necessary parameter for realizing user multiplexing. In IEEE802.11, CWmin (the minimum value of CW) and CWmax (the maximum value of CW) are prescribed. The value of the CWmin is used to calculate the random number for a first transmission, and backoff is performed for a repeated transmission with a CW that doubles the CWmin. Note that the CWmax is the upper limit of the CW. Communication in which a plurality of terminals use the same channel in common is made possible with this backoff control having a random quality. However, in this method, it is possible for a plurality of terminals to transmit a packet at the same time, and in this case a collision of packets will occur, leading to packet receiving error and lowering of transmission quality. Particularly, the lowering of quality is remarkable in real-time type applications such as VoIP.

As prior art relating to priority control in communication methods such as this, there is EDCA (Enhanced Distributed Channel Access) prescribed by IEEE802.11e as shown in the document "Part 11: Wireless LAN Medium Access Control (MAC) and Physical Layer (PY) specifications: Amendment 7: Medium Access Control (MAC) Quality of Service (QoS) Enhancements". In EDCA, there are four types of priority for packets, and packets with a high priority are assigned waiting times for transmission, such as IFS, CWmin, and CWmax, that are short to give these packets priority to be transmitted. In this manner, relative priority control is possible in a communication environment in which various applications of voice, data, and the like coexist.

SUMMARY OF THE INVENTION

However, the conventional method of EDCA only assigns a relative transmission priority ranking to packets having different priorities, and EDCA cannot contribute to maintaining quality and assigning degrees of priority between terminals that transmit packets with the same priority. Accordingly, it is impossible to control the possibility that packets will collide due to a plurality of terminals transmitting packets with the same priority at the same time. When packets collide, even if the retransmission is successful the packets will be delayed, and if the retransmission is not successful then the packets will be lost. When a further plurality of terminals perform backoff in order to gain access to transmit packets, a transmission waiting period, in other words a delay, occurs in terminals whose access to transmit has been taken by another terminal. The probability of such a problem increases as the number of terminals increases. The delay and significant loss of quality caused by the problem described above is particularly seen in real-time type applications typified by VoIP (Voice over Internet Protocol).

Also, a situation can be envisioned in which wireless devices belonging to cells have the possibility of interfering with each other in a transmission environment which has two or more cells having a plurality of terminals that need to transmit packets at regular intervals, such as VoIP. Accordingly, it is desirable to suppress as much as possible the interference that arises in such a communication environment by establishing an efficient schedule.

Here, the present invention has an object of providing a wireless communication device and wireless communication method which can implement efficient control of packet transmission timing that is decentralized and autonomous, and which can improve the quality of transmission, in a communication environment which has two or more cells having a plurality of terminals that need to transmit packets at regular intervals such as VoIP, and in which wireless devices belonging to these cells have the possibility of interfering with each other.

The wireless communication device of the present invention for transmitting packets, on the basis of a packet transmission scheme for allocating wireless bands with virtual carrier sensing, comprises: monitoring module for monitoring packets communicated between other wireless communication devices and wireless base stations for a local cell in which a local wireless communication device is located and another cell; determination module for determining whether a possibility exists that local wireless communication device receives the other-cell interference resulting from communication between the wireless communication device in the other cell and the wireless base station which administers the other cell, on the basis of the monitoring result; occupancy period detection module for detecting an occupancy period occupied due to communication between the wireless communication device in the other cell and the wireless base station, on the basis of the monitoring results, when the determination module determines that a possibility exists that the local wireless communication device receives other-cell interference; and timing recognition module for recognizing a timing for avoiding the other-cell interference in a predetermined period on the basis of the occupancy period detected by the occupancy period detection module. In this manner, a wireless communication device can determine whether there is a possibility of interference from another cell, and when the determination is that there is a possibility that the wireless communication device will receive interference from the other cell, the wireless communication device can recognize the timing for avoiding interference from other cells in a predetermined period.

The determination module described above can be configured to determine the possibility of the local wireless communication device receiving the other-cell interference when neither a transmission source address nor a destination address of a packet obtained from monitoring performed by the monitoring module matches the address of a wireless base station which administers the local cell.

Also, in the wireless communication device of the present invention it is desirable to have a structure to further comprise transmission timing request module for generating a transmission timing request including avoidance timing information for the local wireless communication device to avoid the other-cell interference, and for broadcasting the generated transmission timing request to the other wireless communication device in the local cell, and schedule establishment module for establishing a schedule, on the basis of the avoidance timing information in the transmission timing request, when the local wireless communication device receives the transmission timing request broadcast by the other wireless communication device. In this manner, the local wireless communication device can make timing information to be transmitted agree with another wireless communication device in the local cell in order for the wireless communication device to achieve smooth communication.

It is desirable that the transmission timing request module described above is configured to verify whether the other wireless communication device in the local cell has correctly received the transmission timing request, and to retransmit the transmission timing request to a wireless transmission device when verified that the wireless transmission device has not correctly received the transmission timing request. In this manner, it is possible to recognize a failure in transmitting or receiving of a transmission timing request and quickly retransmit.

It is desirable that the determination module described above is configured to determine whether another wireless communication device is performing communication by an application generating packets at regular intervals, by determining whether the other wireless communication device is generating packets at regular intervals on the basis of the monitoring result of the monitoring module. In this manner, it is possible to recognize whether another wireless communication device is performing communication by an application that generates packets at regular intervals.

It is also desirable that the determination module described above is configured to determine whether a transmission source wireless communication device or a destination wireless communication device of a packet is performing communication by an application generating packets at regular intervals, by specifying vendor distinguishing information on the basis of a transmission source address or a destination address of the packet obtained from monitoring performed by the monitoring module, and by verifying whether the specified vendor distinguishing information matches the vendor distinguishing information of the local wireless communication device. In this manner, it is possible for a wireless communication device comprising VoIP communication functions to recognize whether for example, another wireless communication device is performing communication with a VoIP application.

The wireless communication device of the present invention for transmitting packets on the basis of a packet transmission scheme for allocating wireless bands with virtual carrier sensing, comprises fluctuation time request module for generating a request including slot quantity information or post-fluctuation transfer rate information used by a local wireless communication device, and for broadcasting the generated request to another wireless communication device in a local cell, when transmitting and receiving time periods of a packet fluctuate due to fluctuation in a transfer rate, and schedule change module for changing a schedule, on the basis of the slot quantity information or the post-fluctuation transfer rate information in the request, when the broadcasted request is received by the other wireless communication device. In this manner, each wireless communication device can change a schedule on the basis of the slot quantity information or the post-fluctuation transfer rate information in a request, even when the transfer rate changes while communication is in progress, and a schedule can be established which allows for efficient communication.

As shown above, the present invention can implement efficient control of packet transmission timing that is decentralized and autonomous, and which can improve the quality of transmission, in a communication environment which has two or more cells having a plurality of terminals needing to transmit packets such as VoIP at regular intervals, and in which wireless devices belonging to these cells have the possibility of interfering with each other.

DESCRIPTION OF THE PREFERRED EMBODIMENTS

An embodiment is shown below which uses the present method.

[Explanation of Structure in the Present Embodiment]

Figure 1:
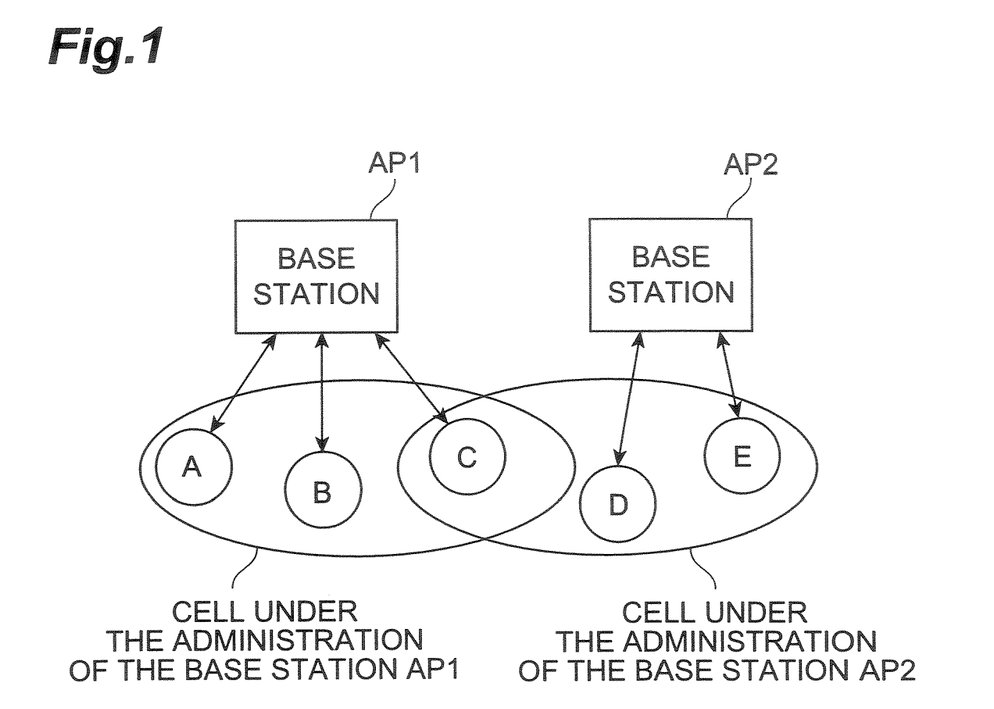
FIG. 1 is a structural drawing of a wireless LAN network in an embodiment of the present invention.

As shown in FIG. 1, a wireless LAN network of the present embodiment is structured including base stations AP1 and AP2 which are wireless LAN base stations (referred to as "base stations" below) using the same or adjoining frequency bands, wireless LAN VoIP terminals A (MAC address xx.xx.01), B (MAC address xx.xx.02) and C (MAC address xx.xx.03) controlled by the base station AP1, and wireless LAN VoIP terminals D (MAC address xx.xx.04) and E (MAC address xx.xx.05) controlled by the base station AP2. These base stations AP1 and AP2 and wireless LAN VoIP terminals (referred to as "terminals" below) A to E are implemented with IEEE802.11b. Note that each terminal A to E corresponds to a wireless communication device in the present invention.

Figure 2:
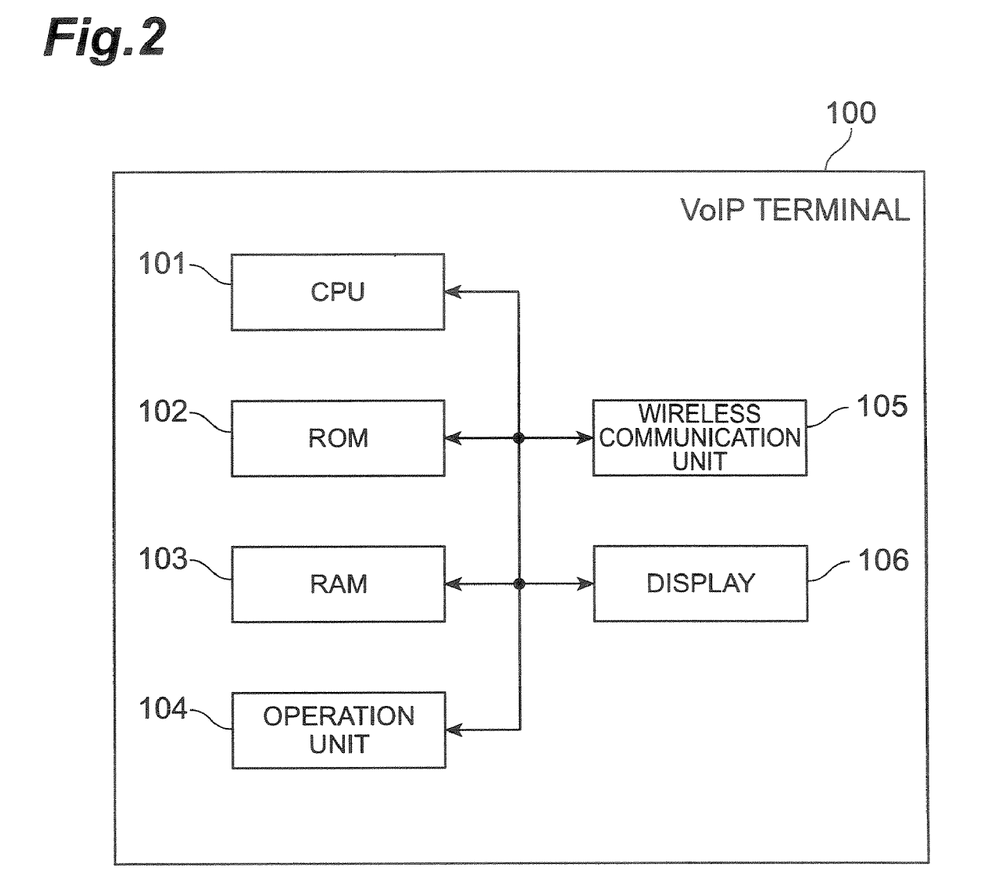
FIG. 2 is a hardware structural drawing of a VoIP terminal.
Figure 3:
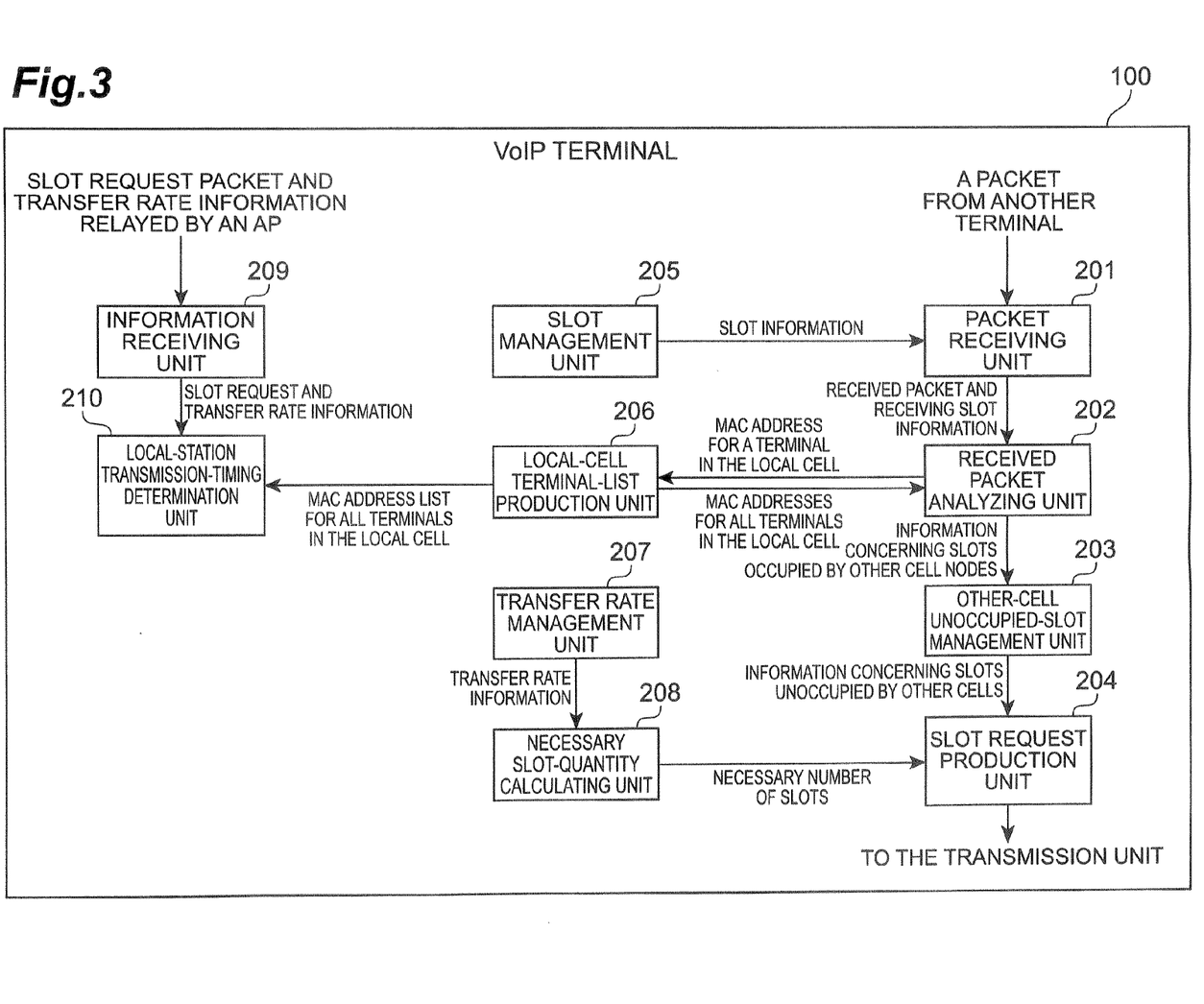
FIG. 3 is a functional block drawing of a VoIP terminal.

Each terminal A to E has a hardware structure such as that shown in FIG. 2 and has a functional block structure such as that shown in FIG. 3. FIG. 1 shows only two base stations AP1 and AP2, and five terminals A to E, however, any appropriate number of terminals controlled by a base station may be employed and any appropriate number of base stations may be employed. The VoIP codec period for all the terminals is 20 ms.

As shown in FIG. 1, the terminal C is in an area in which cells administered by the base station AP1 and cells administered by the base station AP2 overlap (cell overlap portion). More specifically, both base stations AP1 and AP2 exist in the carrier sense range of the terminal C. Also, the terminal B, which performs communication with the base station AP1, is outside the carrier sense range of the base station AP2, however, the terminal B is within the carrier sense range of the terminal D, which is within the cell administered by the base station AP2. The terminal D is outside the carrier sense range of the base station AP1, however, the terminal D is within the carrier sense range of the terminal B, which is within the cell administered by the base station AP1.

As shown in FIG. 2, the terminals A to E according to the present invention (referred to as "the terminal 100" below) comprises CPU 101, ROM 102, RAM 103, an operation unit 104 such as a keypad, a wireless communication unit 105 in which wireless communication using the CSMA/CA method is possible, and a display 106.

As shown in FIG. 3, the terminal 100 of the present invention, when viewed as a functional block structure, is structured including a packet receiving unit 201, a received packet analyzing unit 202, an other-cell unoccupied-slot management unit 203, a slot request production unit 204, a slot management unit 205, a local-cell terminal-list production unit 206, a transfer rate management unit 207, a necessary slot-quantity calculating unit 208, an information receiving unit 209, and a local-station transmission-timing determination unit 210.

Among these elements, the packet receiving unit 201 is implemented by the wireless communication unit 105 of FIG. 2 and has a function of receiving packets from other terminals and base stations.

The received packet analyzing unit 202 is implemented by the wireless communication unit 105 of FIG. 2 and receives packets received by the packet receiving unit 201 and information concerning the slot in which the packet is received. Here, the received packet analyzing unit 202 sends the destination address of the received packet to the local-cell terminal-list production unit 206 to be described below, if the transmission source address of the received packet matches the MAC address of the base station to which the local wireless communication device belongs. Also, the received packet analyzing unit 202 sends the transmission source address of the received packet to the local-cell terminal-list production unit 206 to be described below, if the destination address of the received packet matches the MAC address of the base station to which the local wireless communication device belongs.

The received packet analyzing unit 202 also detects the occupancy period occupied by communication between a terminal and a base station in another cell. More specifically, the received packet analyzing unit 202 sends to the other-cell unoccupied-slot management unit 203 to be described below a slot number for the received packet corresponding to the above "occupancy period occupied by communication between a terminal and base station in another cell" when neither the transmission source address nor the destination address of the received packet is the MAC address of the base station to which the local wireless communication device belongs, and when neither the transmission source address nor the destination address of the received packet match a local station terminal address list stored in the local-cell terminal-list production unit 206.

The other-cell unoccupied-slot management unit 203 is implemented by the CPU 101, the ROM 102 and the RAM 103 of FIG. 2, and recognizes the timing for avoiding other-cell interference in a predetermined period on the basis of the slot number detected by the received packet analyzing unit 202. Here the recognized timing is administered as an unoccupied slot number. More specifically, the other-cell unoccupied-slot management unit 203 administers an unoccupied slot number list which records the unoccupied slot numbers, and deletes a slot number from the unoccupied slot number list when the slot number is received by the received packet analyzing unit 202.

The slot request production unit 204 is implemented by the wireless communication unit 105 of FIG. 2, and produces a packet for broadcasting containing the slot numbers not deleted by the other-cell unoccupied-slot management unit 203 and containing the quantity of slots to be requested by the necessary slot-quantity calculating unit 208 to be described below, and sends the broadcast packet to a transmission unit.

The slot management unit 205 administers the partitioning of time in each VoIP codec period, and the further partitioning of these periods so that one slot is given the time needed for one exchange of transmitting and receiving of a VoIP packet between a base station and a terminal, and administers the allocation of a number to each slot. The packet receiving unit 201 refers to these slot numbers from the slot management unit 205 corresponded to a receiving time, when the packet receiving unit 201 receives a packet.

The local-cell terminal-list production unit 206 is implemented by the CPU 101, the ROM 102 and the RAM 103 of FIG. 2, administers a list of terminals in the local cell, and stores a MAC address sent by the received packet analyzing unit 202 as part of the list of terminals in the local cell.

The transfer rate management unit 207 is implemented by the ROM 102 and the RAM 103 of FIG. 2, and administers a transfer rate used by the local terminal (referred to as "the local station" below) when transmitting and receiving a VoIP packet.

The necessary slot-quantity calculating unit 208 is implemented by the wireless communication unit 105 in FIG. 2, calculates the amount of time for transmitting and receiving needed for one exchange of transmitting and receiving between a base station and a terminal, using the "transfer rate used by the local station" obtained from the transfer rate management unit 207, and then sends this calculation result to the slot request production unit 204.

The information receiving unit 209 receives slot requests sent by other terminals or the local station and relayed by a base station, and receives broadcast packets relating to transfer rate information.

The local-station transmission-timing determination unit 210 refers to these slot requests and this transfer rate information received by the information receiving unit 209, and refers to the local cell terminal MAC address list in the local-cell terminal-list production unit 206, and then makes final determination of the transmission timing for the local station.

Note that the received packet analyzing unit 202 described above corresponds to monitoring module, determination module, and occupancy period detection module, and the other-cell unoccupied-slot management unit 203 corresponds to timing recognition module in the present invention. The slot request production unit 204 corresponds to transmission timing request module, and the local-station transmission-timing determination unit 210 corresponds to schedule establishment module and schedule change module. Also, the received packet analyzing unit 202 and the slot request production unit 204 operate in conjunction to realize fluctuation time request module in the present invention.

[Processing Performed in the Present Embodiment]

An explanation will be given below of the processing performed by the present embodiment, in the order of (1) first processing relating to recognizing terminals that will be influenced by interference from cells in the local cell vicinity, recognizing the timing in which interference from cells in the local cell vicinity will not be received, and establishing a period for allowing transmission in the same period as the period in which interference from cells in the local cell vicinity will not be received, and (2) second processing relating to establishing a schedule when the transmission and receiving occupancy period of a terminal changes.

[First Processing]

First, an explanation will be given of the (1) first processing relating to recognizing terminals that will be influenced by interference from cells in the local cell vicinity, recognizing the timing in which interference from cells in the local cell vicinity will not be received, and establishing a period for allowing transmission in the same period as the period in which interference from cells in the local cell vicinity will not be received.

Figure 4:
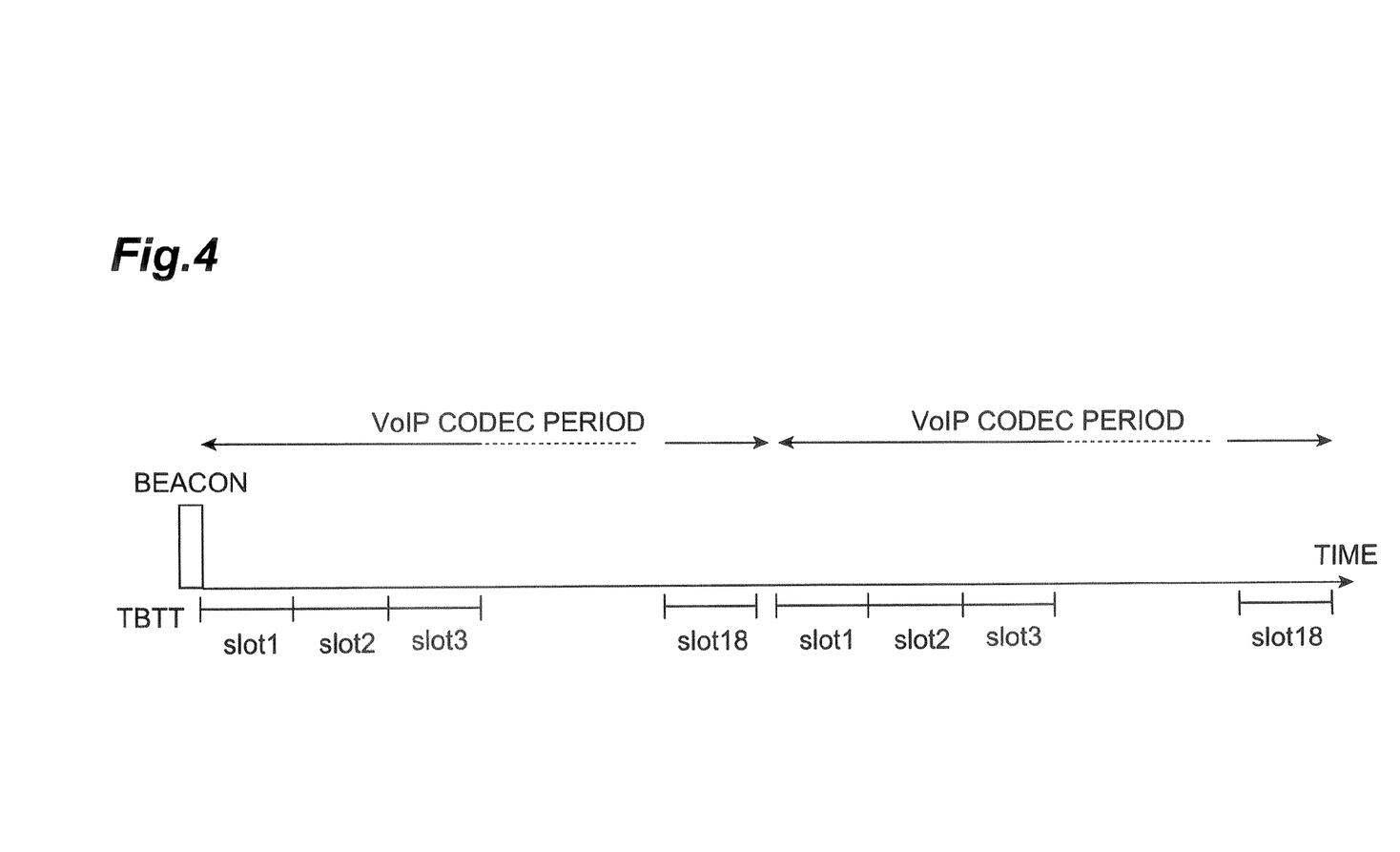
FIG. 4 is a drawing for explaining how to assign slot numbers.

In the first processing, time is divided into VoIP codec periods, and these periods are further divided so that one slot is given the time needed for one exchange of transmitting and receiving of a VoIP packet between a base station and a terminal, and then a number is allocated to the slot. It is necessary for this slot number to be synchronized to all the terminals controlled by the same base station. This slot allocation may be performed, as shown in FIG. 4, in a sequence of 1, 2, 3 . . . with a TBTT (Target Beacon Transmission Time) used as the starting point. The TBTT is recognized by all the terminals in a cell, thus the TBTT can be realized by just performing slot calculations in each terminal, and has the advantage in that a new sequence does not have to be generated in order to sequence the slots. In the present embodiment, the MAC payload in the VoIP packets is 208 bytes, the transfer rate of data in all the terminals is 11 Mbps, the transfer rate in a control frame is 2 Mbps, the CW is 140, and the AIFS is 50 ms. These values are used for convenience in the present embodiment, and any appropriate values may be used. In this case, the transmission period of the header information is 96 µs, the sum of a PLCP preamble of 72 µs and a PLCP header of 24 µs (i.e. 48 bits/2 Mbps). Accordingly, the transmission time of a VoIP packet is:

$$96\mu s + 208 \times 8/11 = 247.27 \mu s$$

and the transmission time of an ACK (14 bytes) is:

$$96\mu s + 14 \times 8/11 = 152 \mu s.$$

Figure 5:
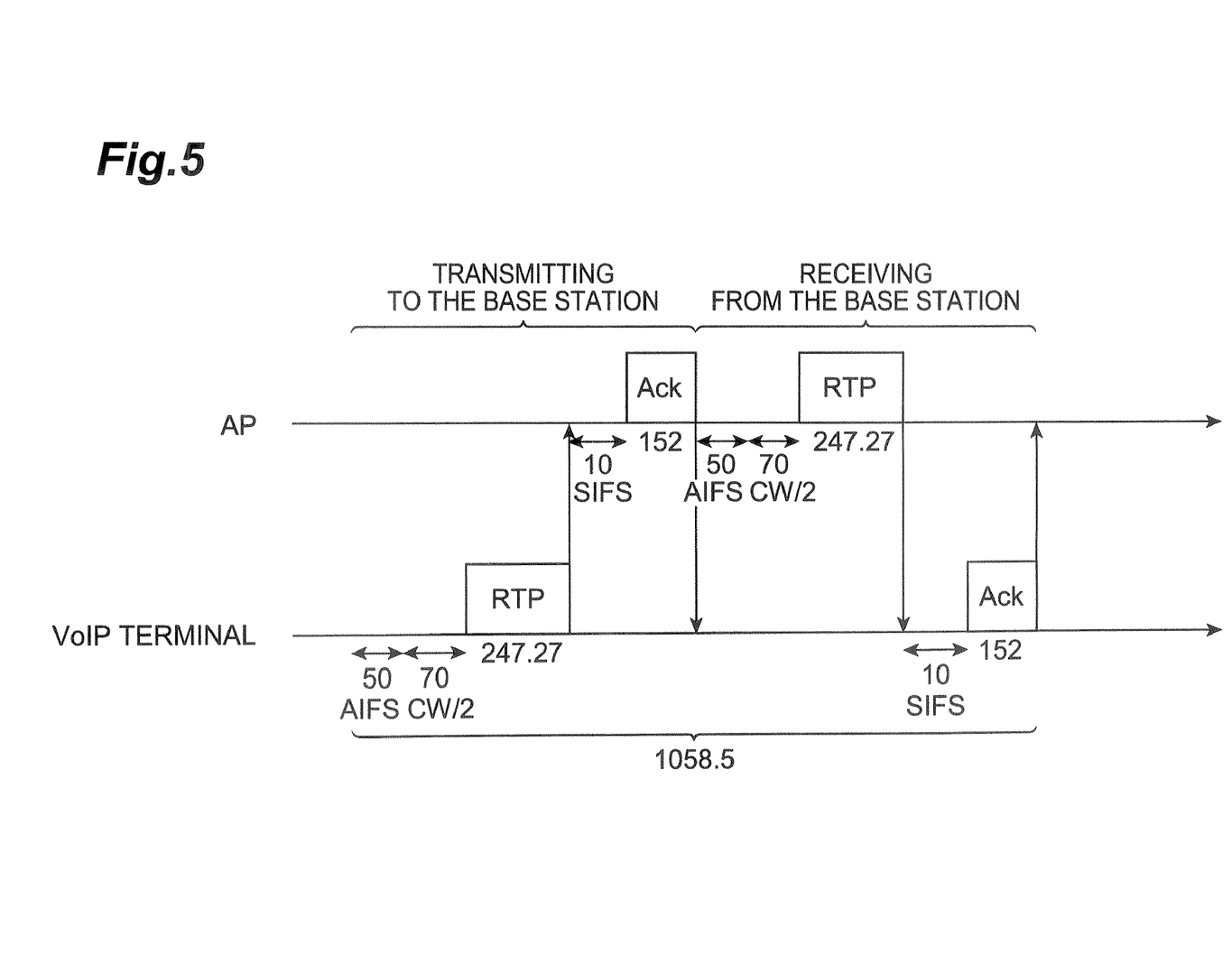
FIG. 5 is a transmitting and receiving sequence drawing showing one exchange of transmitting and receiving between a base station and a terminal.

Note that a VoIP packet length is a fixed length if the codec is fixed, thus each terminal knows the necessary packet length to use in the calculations described above. Accordingly, one exchange of transmitting and receiving between a base station and a terminal is, as shown in FIG. 5, 1.0585 ms. However, micro-second is used as the unit of time in FIG. 5. Accordingly, in the present method one slot takes 1.0585 ms, and the VoIP codec period is 20 ms, thus the number of slots expressed as a whole number is 18 (20/1.0585). Accordingly, as shown in FIG. 4, slot numbers 1 to 18 are repeated.

The VoIP terminals A, B and C controlled by the base station AP1 are assumed to have been transmitting and receiving during prescheduled slots 3, 4 and 5. However, when the transmitting and receiving schedule breaks down for terminals in the cell of the base station AP1, due to VoIP terminals D and E in a cell in the local cell vicinity controlled by the base station AP2 beginning communication, the transmitting and receiving are reinstated with the present method as shown below.

In order to realize smooth communication, transmission timing slots for the terminal C must not overlap with transmission timing slots for other terminals within the local cell, and must not overlap with all the transmission timing slots for the node terminals D and E and the base station AP2 of the other cell. Furthermore, transmission timing slots for the terminal B must not overlap with transmission timing slots for other terminals within the local cell, and must not overlap with the transmission timing slots for the terminal D of the other cell.

Figure 6:
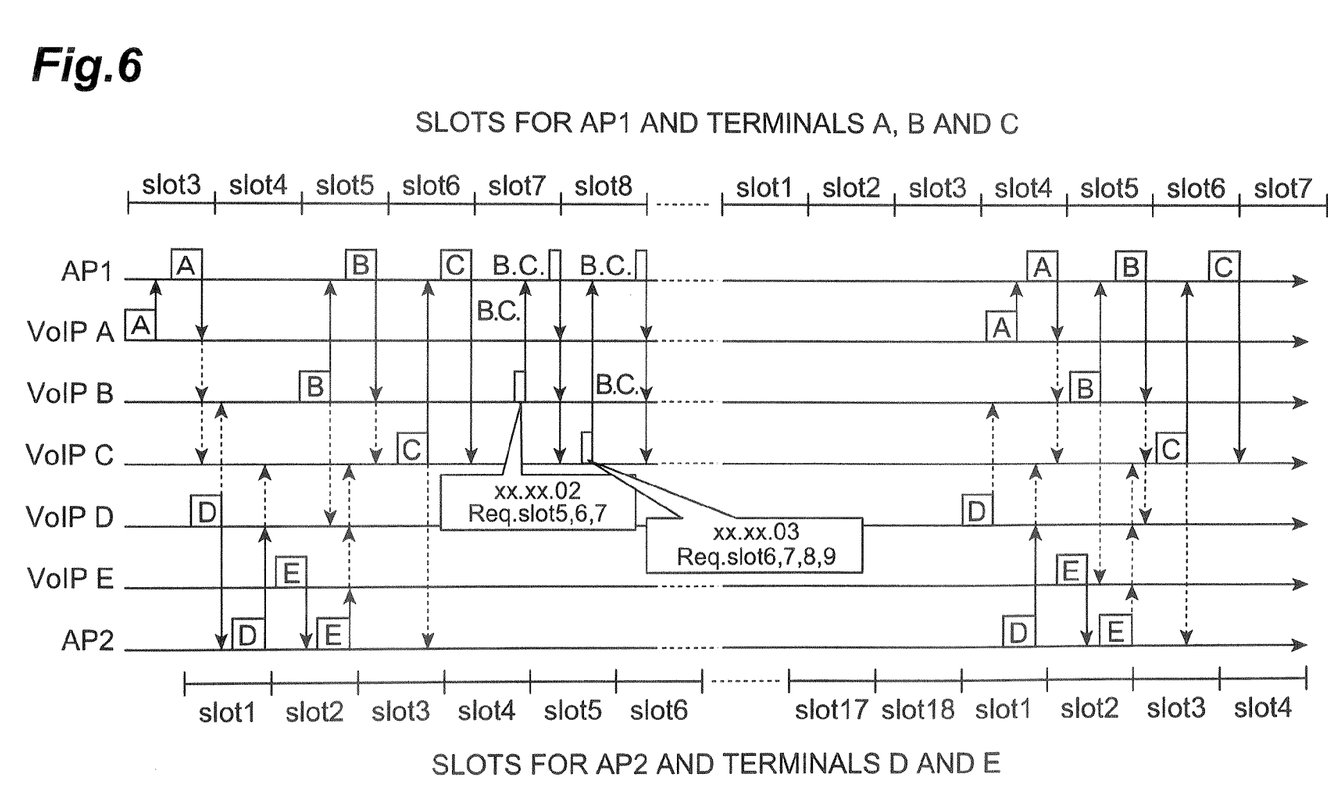
FIG. 6 is a transmitting and receiving sequence drawing for a case in which a terminal B monitors a packet transmitted by a terminal D in a slot 3 and slot 4.

The terminal B monitors all the packets in other stations. The terminal B recognizes that when the transmission source or destination address of a monitored packet is a MAC address of the base station AP1, the transmission source or destination address of this packet is a terminal in the local cell. This monitoring allows the terminal B to recognize that the terminals A and C exist in addition to the terminal B in the local cell. The terminal B stores the local cell terminal list for terminals in the local cell, using the MAC addresses as identifiers. Furthermore, the terminal B is within the carrier sense of the terminal D, thus the terminal B monitors packets transmitted by the terminal D to the base station AP2. Both the transmission source address and the destination address of a packet being transmitted from the terminal D to the base station AP2 do not match a MAC address in the base station AP1, thus the terminal B recognizes the possibility of the local station receiving interference due to a packet of another cell. The terminal B recognizes that a packet relating to the terminal D is received each time in substantially the same slot, and that the packet is being generated at regular intervals by the terminal D. When the transmission time of a packet generated at regular intervals overlaps another transmission one time, the transmission time will overlap each additional time and the transmission failure will be repeated, thus it is necessary to avoid this failure. As shown in FIG. 6, it is assumed that the terminal B monitors packets transmitted by the terminal D in slots 3 and 4 in the base station AP1. In this case, the terminal B set all the slots besides slots 3 and 4 as local station communication slots, thus the terminal B broadcasts a slot request packet to all the terminals in the local cell. Requested slot numbers 5, 6 and 7 are recorded in the request packet. This signifies that the terminal B is requesting that a slot be allotted to the local station from slot numbers 5, 6 and 7, giving preference in order of the sequence of the request. The other terminals A and C recognize that the terminal B is requesting one of slots 5, 6 or 7 by receiving this broadcast. Here, only three slot request numbers 5, 6 and 7 are recorded, however, the number of slots requested as candidates may be set as appropriate.

Also, the terminal C is within the carrier sense of both the base stations AP1 and AP2, more specifically, the terminal C lies in an overlap portion, thus in order to realize smooth communication the transmission timing of the terminal C must not overlap the transmission timing of any of the base station AP2 and the terminals D and E. The terminal C also monitors all of the packets just as the terminal B, and recognizes the existence of the terminals A and B in the local cell. Furthermore, the terminal C monitors the communication packets sent from the base station AP2 to the terminals D and E. Both the transmission source addresses and the destination addresses in these packets do not match the MAC addresses in the base station AP1, thus the terminal C recognizes that the local station will receive interference from cells in the local cell vicinity. The terminal C, as shown in FIG. 6, monitors that packets transmitted from the base station AP2 to the terminals D and E in slots 3, 4 and 5. At this time the terminal C must avoid using slots 3, 4 and 5 for transmission. Accordingly, the terminal C transmits a slot request broadcast with the requested slot numbers 6, 7, 8 and 9. The terminals A and B, which receive this broadcast packet, recognize that the terminal C desires slots 6, 7, 8 and 9 in this order.

The terminal A also monitors all of the packets, however, the terminal A recognizes that the destination and transmission source addresses for all of the monitored packets matches a MAC address in the base station AP1, and recognizes that the local station will not receive interference from another cell. In this case, the terminal A may recognize only the terminals in the local cell from the local cell terminal list, and in the present embodiment the terminal A does not issue a slot request. However, the terminal A may issue a slot request. In this case the transmission of a slot request packet occupies part of the wireless airwaves, and blocks other terminals from transmitting, thus the case in which the terminal A does not issue a request allows for more efficient use of the wireless airwaves.

At this time the terminals A, B and C recognize that the terminals B and C have issued a slot request. Here, the most preferred slot of the two terminals do not overlap, so slots are allocated in accordance with the requests to each terminal. More specifically, slot 5 is allocated to the terminal B and slot 6 is allocated to the terminal C. Furthermore, any slot other than slots 5 and 6 may be allocated by the terminal A as the local station communication slot. In the present embodiment, the schedule allocates slot 4 to the terminal A. By allocating slot 4, which is in the vicinity of slots 5 and 6, it is possible to maintain orderly communication. However, any number may be set as appropriate for this slot number.

Another effective method of allocating a slot in the terminal A is to allocate slots to each terminal that did not request a slot, in sequence from slot 1. This is effective for cases in which in addition to the terminals A, B and C, another terminal A' which has not received interference from another cell is in the cell of the base station AP1. When both the terminals A and A' do not issue a slot request, there is a possibility that both the terminals A and A' will allocate slot 4 as a local communication slot. In this case, it would be necessary for the terminals A and A' to compete for access to transmit at regular transmission intervals, and the transmission failure rate would increase. Accordingly, if a method is implemented to allocate slots from slot 1, skipping slots already requested, to terminals that have not issued a slot request, in sequence according to the MAC addresses, then slot 1 will be allocated to the terminal A and slot 2 to the terminal A', and smooth communication will be realized.

Also, a method will be explained below for allocating slots when a plurality of terminals issue a slot request for the same slot. In the present embodiment, the slot numbers in the slot request packet of the terminal B are assumed to be 5, 6, and 7, and the slot numbers in the slot request packet of the terminal C are assumed to be 5, 6, 7 and 8. In this case, the terminals B and C recognized that their requests overlap due to the terminals B and C receiving the slot request packet of the other terminal. In this case, a method is implemented in which the terminal with the smaller MAC address is given priority to receive the desired slot, and slot 5 is allocated to the terminal B and slot 6 is allocated to the terminal C.

As shown above, priority periods are set in each terminal by the results of scheduling transmission timing in each terminal as shown above, and transmission is performed.

Also, the broadcasted slot requests do not request an ACK from the receiving terminals, thus a mechanism is necessary to check if other terminals actually received the slot request correctly and acknowledged the request of the local station. Here, in the present embodiment, after transmission of a slot request, and after a predetermined length of time, the local station recognizes that its request has been acknowledged by the fact that other terminals in the local cell have not occupied the requested slot. For example, in the present embodiment, it is assumed that even though the terminal C requested slot 6, either the terminal A or the terminal B used slot 6 for transmitting or receiving for five consecutive time intervals, thus the terminal C continues to experience transmission failures. At this time, the terminal C recognizes that the slot request issued by the terminal C has not been correctly received by the other terminals, and retransmits the same slot request packet. Note that in the present embodiment, five consecutive time intervals has been set as the determination threshold to determine whether other terminals correctly received the slot request, however, this value of five may be any appropriate value and does not have to be consecutive. For example, a determination threshold may be used in which determination is made that the terminal C experienced a transmission failure when the terminal A or B used slot 6 five times in 10 intervals.

The efficiency of the present method increases even further by checking whether the traffic generated by interference from other cells is VoIP. The reason being that the effect of partitioning slots as predetermined intervals in the present method is small if the traffic generated by inference from other cells is not at regular intervals.

Two methods will be explained below for checking whether the traffic generated by inference from other cells is VoIP.

The first method is shown below. The VoIP terminal B has been transmitting and receiving on slot 4, however, due to the terminal D, which is not in the local cell, failures are experienced in transmitting and receiving on slot 4. At this time the terminal B recognizes that the terminal D is a VoIP terminal generating packets at regular intervals, thus the terminal B monitors the communication of the terminal D for a period of 10 intervals. At this time the terminal B recognizes that the terminal D generates packets at regular intervals by checking whether the terminal D transmitted or received seven or more times on slot 4 or on the adjoining slots 3 and 5. In this example, seven times or more within 10 intervals has been set as the determination threshold value, however, this value may be any appropriate value.

Next, the second method is shown below. If the terminal D has the same vendor ID as the terminal B, then the terminal B can recognize that the probability of the terminal D being a VoIP terminal is high. This method can only be realized when the terminals B and D are manufactured by the same vendor, however, in contrast to the previous method, this method has an advantage in that it is not necessary to monitor for a long period, and can be realized by monitoring a packet one time. The vendor ID can be determined from the first three bytes in the MAC address. Accordingly, this method can be realized by determining whether the first three bytes in the destination or transmission source address of the packet being monitored match the first three bytes of the MAC address of the local station.

The first processing described above enables appropriate recognition of terminals which will be influenced by interference from cells in the local cell vicinity, appropriate recognition of the timing in which interference will not be received from cells in the local cell vicinity, and appropriate establishment of synchronized periods for transmission at a timing in which interference is not received from cells in the local cell vicinity.

[Second Processing]

Next, an explanation will be given of the (2) second processing relating to establishing a schedule when the transmission and receiving occupancy period of a terminal changes. Here it is assumed that there is no interference whatsoever from cells in the local cell vicinity in either the base station AP1 or in the base station AP2, and the explanation of the processing will concentrate on only the base station AP1 and the terminals A, B and C.

Figure 7:
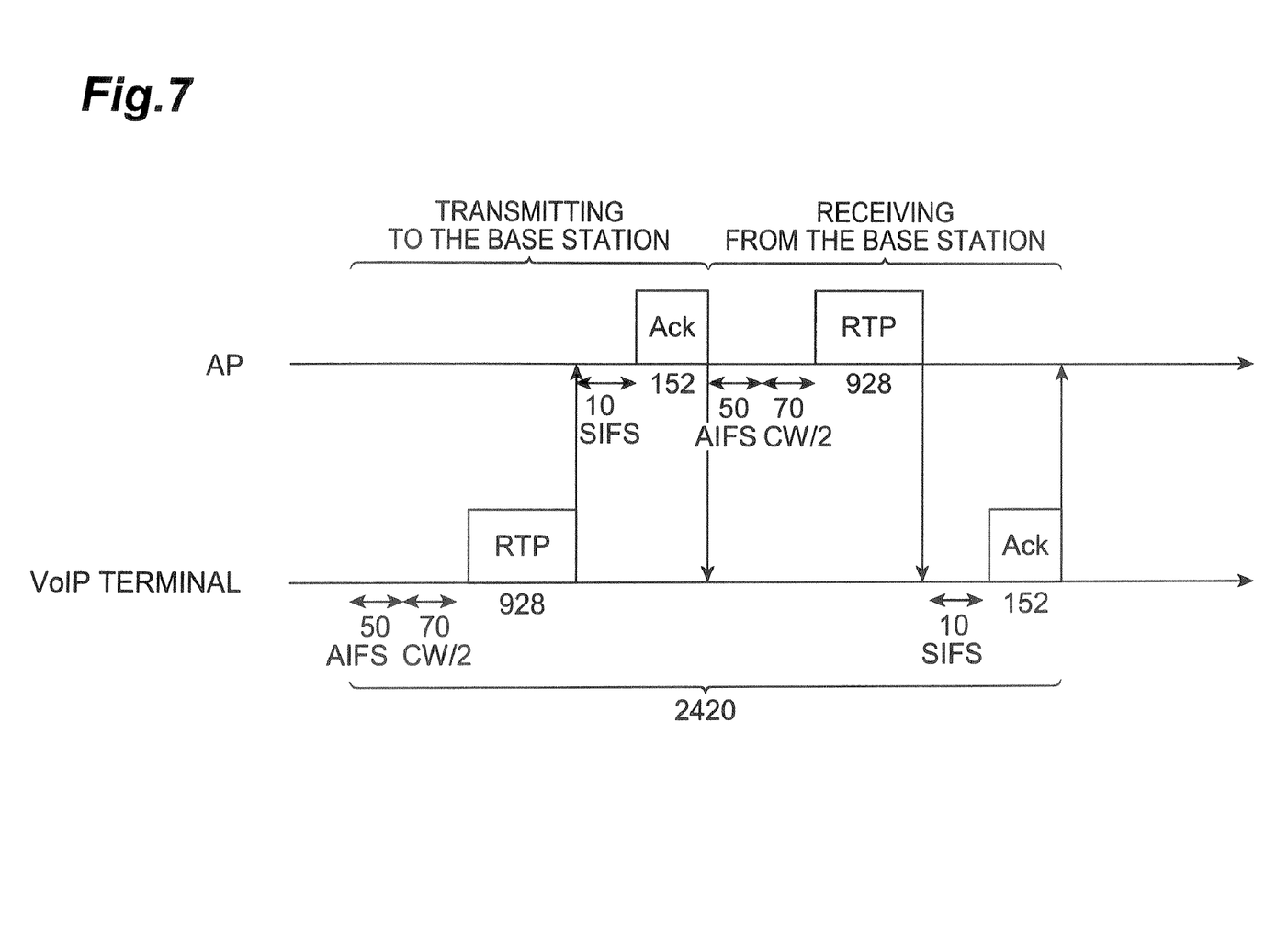
FIG. 7 is a transmitting and receiving sequence drawing showing exchange of transmitting and receiving between a base station and a terminal when a transfer rate goes below 2 Mbps.

It is assumed that in the present embodiment the transfer rate drops to 2 Mbps in the terminal A, which has been communicating with a transfer rate of 11 Mbps, due to degradation or the like of the wireless communication condition of the terminal A. In this case, the transmission time for a VoIP packet is:

$$96\mu s + 208 \times 8/2 = 928\mu s,$$

and the time required for one exchange of transmitting and receiving between the base station AP1 and the terminal A changes from that of FIG. 5 to that of FIG. 7. However, a microsecond is used as the unit of time in FIG. 7. One slot is 1.0585 ms, thus in order to meet the 2.42 ms requirement, it is necessary to allocate three slots.

Figure 8:
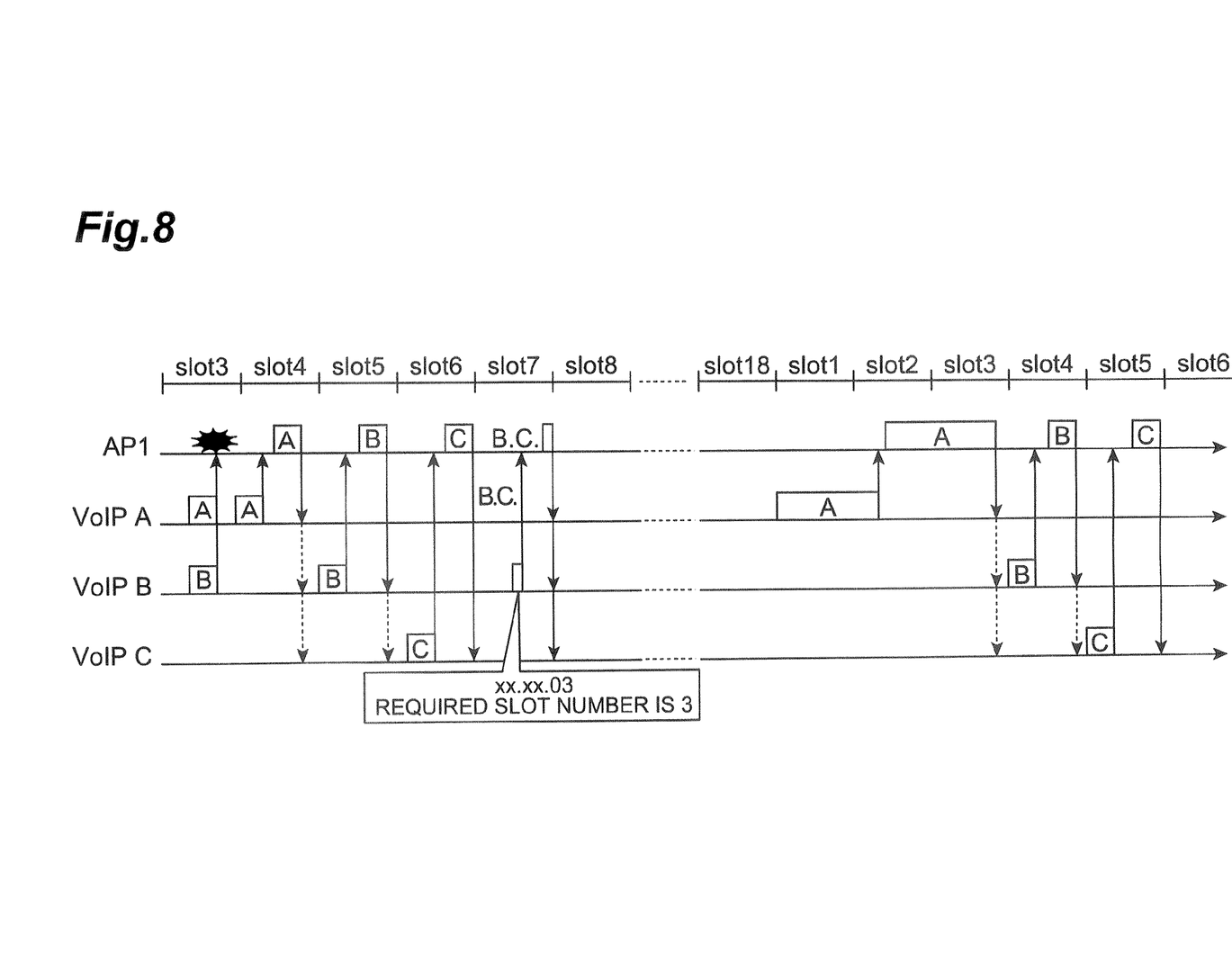
FIG. 8 is a sequence drawing showing schedule establishment in terminals A, B and C.

For this reason, the present embodiment has a schedule establishing function, which can respond to fluctuations in transmitting and receiving time periods. The timing sequence for establishing a schedule for this situation in the terminals A, B and C is shown in FIG. 8. In the present embodiment, the terminal A requires three slots for transmitting and receiving at the local station, thus the terminal A registers the need for three slots in the slot request packet, and broadcasts this slot request packet. The other terminals B and C, which receive this slot request packet, recognize that the terminal A requires three slots. Accordingly, the terminals A, B and C recognize that slots 1, 2 and 3 are allocated to the terminal A, slot 4 is allocated to the terminal B, and slot 5 is allocated to the terminal C. Afterwards, each terminal shifts to a scheduled transmission phase and performs transmission according to the slot schedule. In VoIP, packets are generated at regular intervals, thus if scheduling is performed at fixed intervals, then afterwards that schedule may be repeated for each VoIP codec period.

Figure 9:
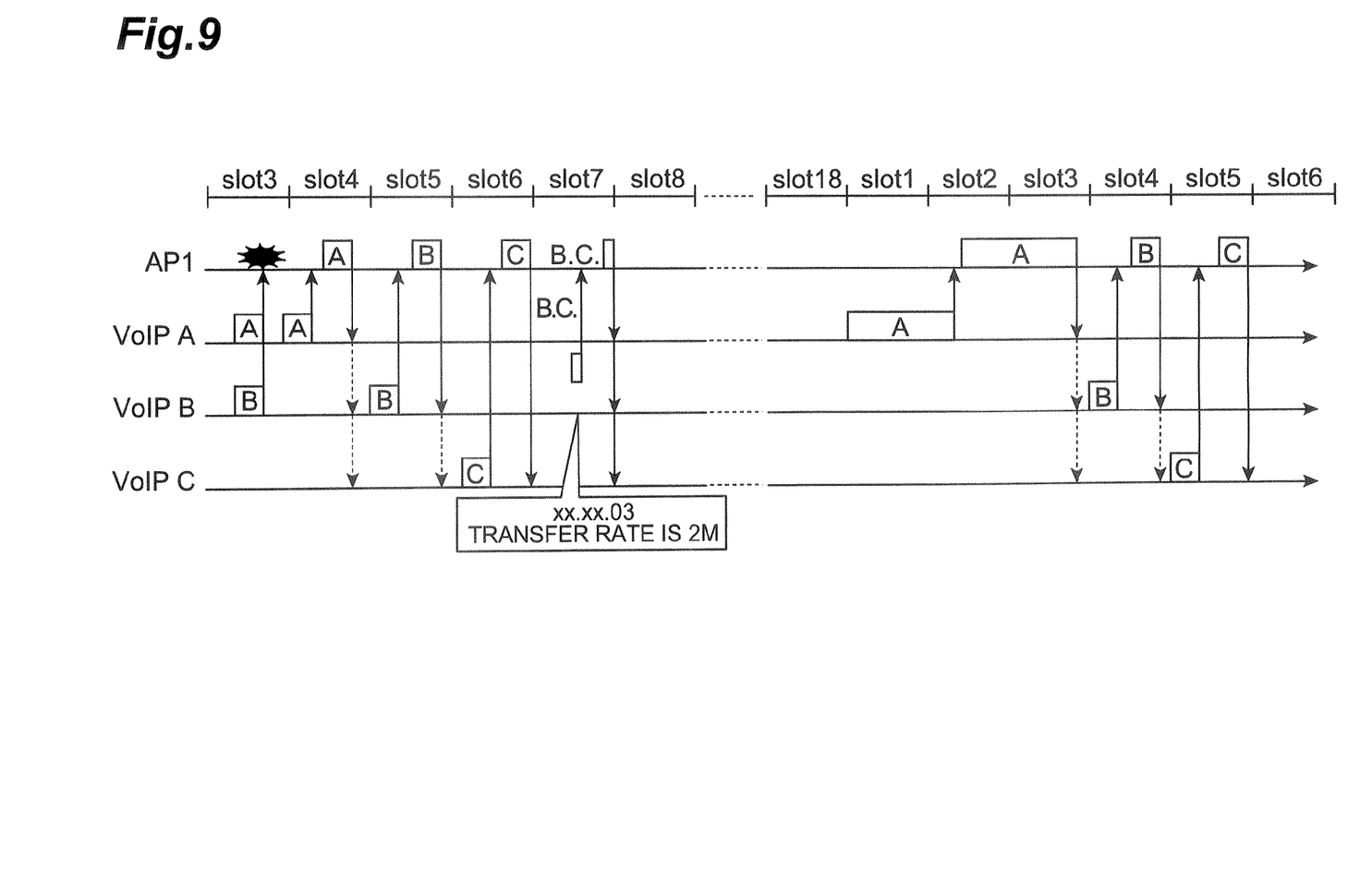
FIG. 9 is a sequence drawing showing a case in which a value of a transfer rate itself is broadcast.

Also, the transfer rate itself may be broadcast. In other words, as shown in FIG. 9, the terminal A transmits the request packet with 2 Mbps registered as the transfer rate. The other terminals B and C, which receive this request packet, each internally calculate the transmitting and receiving period for the case of a 2-Mbps transfer rate in the same manner as with the calculation method described above, and recognize the need to maintain the required 2.42 ms for transmitting and receiving in the terminal A. Then the terminals A, B and C recognize that slots 1, 2 and 3 are allocated to the terminal A, slot 4 is allocated to the terminal B, and slot 5 is allocated to the terminal C. Also, as another method of allocating slots, only slot 1 may be changed to 2.42 ms, and the other slots are maintained at 1.0585 ms, and the terminals A, B and C recognize that slot 1 is allocated to the terminal A, slot 2 is allocated to the terminal B, and slot 3 is allocated to the terminal C. Also, the terminal A may calculate the transmitting and receiving period for a transfer rate of 2 Mbps and register the value of that period, 2.42 ms, in the slot request packet, instead of the transfer rate itself. In this manner, the terminals B and C can omit the calculations needed to determine the transmitting and receiving period.

The second processing described above enables each terminal to change a schedule and establish a schedule for performing communication efficiently, even if a transfer rate changes in midstream, on the basis of slot number information or transfer rate information after a fluctuation.

The disclosure of Japanese Patent Application No. 2006-083316 filed on Mar. 24, 2006 including specification, drawings and claims is incorporated herein by reference in its entirety.

What is claimed is:

1. A wireless communication device for transmitting packets, on the basis of a packet transmission scheme for allocating wireless bands with virtual carrier sensing, comprising:

a monitoring module configured to monitor packets communicated between other wireless communication devices and wireless base stations, for both a local cell in which a local wireless communication device is located and another cell;

a determination module configured to determine whether a possibility exists that the local wireless communication device receives other-cell interference resulting from communication between the wireless communication device in the other cell and the wireless base station which administers the other cell, on the basis of a monitoring result by the monitoring module;

an occupancy period detection module configured to detect an occupancy period occupied due to communication between the wireless communication device in the other cell and the wireless base station, on the basis of the monitoring result, when the determination module determines that a possibility exists that the local wireless communication device receives the other-cell interference; and a timing recognition module configured to recognize a timing for avoiding the other-cell interference in a predetermined period on the basis of the occupancy period detected by the occupancy period detection module, wherein the determination module is configured to determine the possibility of the local wireless communication device receiving the other-cell interference when neither a transmission source address nor a destination address of a packet obtained from monitoring performed by the monitoring module matches the address of a wireless base station which administers the local cell.

2. The wireless communication device according to claim 1, further comprising:

a transmission timing request module configured to (1) generate a transmission timing request including avoidance timing information for the local wireless communication device to avoid the other-cell interference, and (2) broadcast the generated transmission timing request to the other wireless communication device in the local cell; and a schedule establishment module configured to establish a schedule, on the basis of the avoidance timing information in the transmission timing request, when the local wireless communication device receives the transmission timing request broadcast by the other wireless communication device.

3. The wireless communication device according to claim 2, wherein the transmission timing request module is configured to verify that the other wireless communication device in the local cell correctly has received the transmission timing request, and retransmit the transmission timing request to a wireless transmission device when verified that the wireless transmission device has not correctly received the transmission timing request.

4. The wireless communication device according to claim 1, wherein the determination module is configured to determine whether another wireless communication device is performing communication by an application generating packets at regular intervals, by determining whether the other wireless communication device is generating packets at regular intervals on the basis of the monitoring result of the monitoring module.

5. The wireless communication device according to claim 1, wherein the determination module is configured to determine whether a transmission source wireless communication device or a destination wireless communication device of a packet is performing communication by an application generating packets at regular intervals, by specifying vendor distinguishing information on the basis of a transmission source address or a destination address of the packet obtained from monitoring performed by the monitoring module, and by verifying whether the specified vendor distinguishing information matches the vendor distinguishing information of the local wireless communication device.

6. The wireless communication device according to claim 2, further comprising:
    a fluctuation time request module configured to generate a request including slot quantity information or post-fluctuation transfer rate information used by a local wireless communication device, and to broadcast the generated request to another wireless communication device in a local cell, when transmitting and receiving time periods of a packet fluctuate due to fluctuation in a transfer rate; and
    a schedule change module configured to change a schedule, on the basis of the slot quantity information or the post-fluctuation transfer rate information in the request, when the broadcasted request is received by the other wireless communication device.

7. A wireless communication method for a wireless communication device which transmits packets on the basis of a packet transmission scheme for allocating wireless bands with virtual carrier sensing, the method comprising:
    monitoring packets communicated between other wireless communication devices and wireless base stations for both a local cell in which a local wireless communication device is located and another cell;
    determining whether a possibility exists that the local wireless communication device receives other-cell interference resulting from communication between the wireless communication device in the other cell and the wireless base station which administers the other cell, on the basis of the monitoring result;
    detecting an occupancy period occupied due to communication between the wireless communication device in the other cell and the wireless base station, on the basis of the monitoring results, when a determination is made that a possibility exists that the local wireless communication device receives the other-cell interference; and
    recognizing a timing for avoiding the other-cell interference in a predetermined period on the basis of the detected occupancy period, wherein
    the determining includes determining the possibility of the local wireless communication device receiving the other-cell interference when neither a transmission source address nor a destination address of a packet obtained from the monitoring matches the address of a wireless base station which administers the local cell.

8. The wireless communication method according to claim 7, further comprising:
    generating a transmission timing request including avoidance timing information for the local wireless communication device to avoid the other-cell interference;
    broadcasting the generated transmission timing request to the other wireless communication device in the local cell; and
    establishing a schedule, on the basis of the avoidance timing information in the transmission timing request, when the local wireless communication device receives the transmission timing request broadcast by the other wireless communication device.

9. The wireless communication method according to claim 8, further comprising:
    generating a request, from a wireless communication device, including slot quantity information or post-fluctuation transfer rate information used by the wireless communication device, and broadcasting the generated request from the wireless communication device to another wireless communication device in a local cell, when transmitting and receiving time periods of a packet fluctuate due to fluctuation in a transfer rate; and
    changing a packet transmission schedule, on the basis of the slot quantity information or the post-fluctuation transfer rate information in the request, when the other wireless communication device receives the broadcasted request, the packet transmission schedule indicating time-divided slots, of a period, in which the wireless communication device is scheduled to transmit packets.

* * * * *